(12) United States Patent
Sann et al.

(10) Patent No.: US 10,005,010 B2
(45) Date of Patent: Jun. 26, 2018

(54) FILTER DEVICE

(71) Applicant: HYDAC FILTERTECHNIK GMBH, Sulzbach/Saar (DE)

(72) Inventors: Norbert Sann, Riegelsberg (DE); Christian Schneider, Mandelbachtal (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 87 days.

(21) Appl. No.: 15/096,343

(22) Filed: Apr. 12, 2016

(65) Prior Publication Data

US 2016/0310878 A1 Oct. 27, 2016

(30) Foreign Application Priority Data

Apr. 22, 2015 (DE) .................. 10 2015 005 136

(51) Int. Cl.
*B01D 29/90* (2006.01)
*B01D 29/15* (2006.01)
*B01D 29/96* (2006.01)

(52) U.S. Cl.
CPC ........... *B01D 29/902* (2013.01); *B01D 29/15* (2013.01); *B01D 29/96* (2013.01); *B01D 2201/291* (2013.01); *B01D 2201/302* (2013.01); *B01D 2201/4007* (2013.01); *B01D 2201/4053* (2013.01)

(58) Field of Classification Search
CPC ...... B01D 29/902; B01D 29/96; B01D 29/15; B01D 2201/4053; B01D 2201/4007; B01D 2201/302; B01D 2201/291

USPC .... 210/493.2, 450, 444, 247, 305, 304, 306, 210/320
See application file for complete search history.

(56) References Cited

U.S. PATENT DOCUMENTS 6,936,084 B2 * 8/2005 Schlensker ........ B01D 46/0012
210/352

FOREIGN PATENT DOCUMENTS

| DE | 42 40 656 | 7/1993 |
|---|---|---|
| DE | 10 2010 005 978 | 8/2011 |
| DE | 10 2014 011 444 | 3/2015 |
| WO | 2009/019442 | 2/2009 |
| WO | 2012/136801 | 10/2012 |

\* cited by examiner

*Primary Examiner* — Madeline Gonzalez
(74) *Attorney, Agent, or Firm* — Wenderoth, Lind & Ponack, L.L.P.

(57) ABSTRACT

A filter device with a filter body (1) has a filter bowl (3) and a filter head (5) formed by a removable locking piece of the filter bowl (3). The filter head (5) has a connection point (15) for an unfiltrate flow and a connection point (27) for discharging a filtrate flow. A filter element (7) containing filter material (11) is connected between the connection points (15, 27) and is disposed inside the filter bowl (3) for the filtration of the unfiltrate, specifically for particle contamination. A flow directing device (33) directs the unfiltrate flow to the surface sections of the filter material (11) of the filter element (7) to provide a filtering action when the device is in operation. The flow directing device is a molded component (33) that belongs to the filter head (5) and to which a fluid flow is applied.

19 Claims, 6 Drawing Sheets

FILTER DEVICE

BACKGROUND OF THE INVENTION

The invention relates to a filter device with a filter body that comprises a filter bowl and a filter head formed by a removable locking piece of the filter bowl. The filter head is provided with at least one connection point for supplying the unfiltrate flow and at least one further connection point for discharging the filtrate flow. At least one filter element contains filter material, is connected between the respective connection points and is disposed inside the filter bowl for the filtration of the unfiltrate, specifically for particle contamination. A flow directing device is provided that directs the unfiltrate flow to the surface sections of the filter material of the filter element to provide a filtering action when the device is in operation.

FIELD OF THE INVENTION

Filter devices of this kind are used in many different fields. They are widely used in technological applications for the cleaning of process fluids such as hydraulic fluids, fuel, lubricants, coolants and the like. Since filter devices are significant system components, flawless operation and filter performance is a prerequisite for trouble-free operation of the plants concerned. Considering that malfunctions that cause damage and breakdowns can lead to very high expenses, reliability is a significant factor.

To improve reliability and to reduce the mechanical stresses of flow forces on the filter material, which are caused in operation by the fluid flow, the prior art seeks to protect the filter material of the filter element from the direct impact of flow through a baffle plate. DE 10 2010 005 978 A1 discloses, in a filter element of the kind described at the outset, the respective prior art with a flow directing device disposed upstream of the filter material in fluid flow direction with the purpose of evenly distributing the fluid flow. In this known solution, the inlet for the unfiltrate flow at the filter head of the filter body is designed such that the unfiltrate flow impacts in axial direction on the top of the flow-facing end cap of the filter element, which is disposed in the filter body. The end cap is especially shaped to act as a flow directing device. Since the distribution effect here is dependent on the shape of the inlet in the filter head, the filter head design in the known solution is fixed to a particular arrangement of the fluid guidance that commences from the supply connection point. In other words, placing the connecting points on the filter head in any desired position is difficult. A further disadvantage of the known solution is that the respective end cap of the filter element must be shaped especially to be able to act as a flow directing device. The associated increase of the production cost for a filter element that is designed to be particularly cheap to be produced as a replacement or disposable item is a major disadvantage.

SUMMARY OF THE INVENTION

Based upon the prior art, an object of the invention to provide an improved filter device, particularly in respect of favorable production and operating costs.

According to the invention this object is basically met in accordance with the invention in which a filter device of the kind described has a flow directing device being a molded component that forms part of the filter head. The function of controlling the flow process is moved from the filter element to the filter head for impact protection for the immediate reduction of the flow stress on the filter material. Also, in terms of a desired distribution of the fluid flow, the advantages of controlling the flow towards the filter material can be utilized without having to use filter elements with a specially designed end cap. Apart from the achieved reduction of the production cost due to the lower production cost of the filter elements, reduced consequential costs are due to the operationally required filter element changes, which provide an efficient filter performance with lower overall operating costs. Since the invention does not necessitate an axial inflow to the end cap of the filter element for effective control of the flow distribution, which axial inflow leads in the known solution to limitations concerning the position of the connection points on the filter head, the positioning of the connection points and the fluid guidance in the filter head is freely selectable apart from the fact that the molded component in the filter head is disposed in the fluid stream.

Thus, the connection points for supply and discharge can be provided on the filter head in the positions that are most suited to the respective connection constraints.

The molded component may take the form of an inserted component or it may be an integral part of the filter head, which is particularly preferred.

In particularly advantageous exemplary embodiments the molded component is disposed in the filter head at the location of the supply connection point of the unfiltrate such that it forms a type of flow divider and provides at least two flow directing surfaces that divert the unfiltrate flow. The unfiltrate flow then enters via the connection point, into diverging flow directions within an inflow chamber that is open towards the filter bowl. To this extent the molded component not only acts as impact protection for the filter material, but also forms with the diverging flow surfaces directing a flow that spreads in the inflow chamber in form of a flow line. The unfiltrate flows are then distributed and homogenous from the inflow chamber to the outer circumferential area of the filter material.

A particularly advantageous arrangement may be where, with the filter element oriented vertically, an end cap of the filter element, which encloses the plain cylindrical outer surface of the filter material, forms with an outer annular surface the bottom of the inflow chamber. From the bottom of the inflow chamber, which the flow path of the unfiltrate stream extends via the circumferential edge of the annular surface into the chamber that surrounds the outer surface of the filter material. The end cap may form a further flow directing surface with the surface of the annular surface, advantageously in form of a conical surface that slopes towards the circumferential edge of the end cap, for example.

In advantageous exemplary embodiments, the connection point for the unfiltrate flow is formed by a lateral inlet port in the filter head. In the filter head, the molded component takes the shape of a fin facing the inlet port and spanning the inlet port cross-section, and extends in the inflow chamber vertically to the upper end cap of the filter element, which in operational orientation extends vertically.

At the annular surface that forms the bottom of the inflow chamber, the upper end cap of the filter element may be provided with an integral projection that is formed such that, as an additional component of the flow directing device, it forms a continuous extension of the flow directing surfaces of the molded component when the filter element is in operational orientation. This extension ensures that the flow is directed optimally over the entire length of the inflow chamber.

In particularly advantageous exemplary embodiments, in which the element seat for the filter element inside the filter head is provided by a receptacle that takes the form of a pipe socket, with the receptacle engaging a central opening in the upper end cap of the filter element, oriented in operating position, to enable the discharge of the filtrate stream from the internal filter cavity of the filter element, the vane-like molded component of the flow directing device may advantageously be molded to the outside of the pipe socket.

In exemplary embodiments of this kind, the arrangement may advantageously be such that the molded component on that end which, with the filter element in operating orientation, abuts the shoulder of the end cap. The shoulder of the end cap is provided with interacting positioning elements, which predetermine a rotating position for the operating position of the filter element. This arrangement not only ensures the uninterrupted continuation of the flow directing surfaces of the molded component by the shoulder, but the positioning elements on the molded component and on the shoulder may be formed such that, like in a lock and key system. Only a filter element with suitable specifications can then be brought into operating position on the element seat.

In particularly advantageous exemplary embodiments, in which the inflow chamber is designed to have a greater height in the part that is adjacent to the inlet port than in the remaining part that is separated from it, the arrangement may be such that, with clearance to the molded component, inclined surfaces, similar to those of parts of a bell-shaped mantle that widens out in the direction towards the end cap, form additional flow directing surfaces that guide the unfiltrate flow towards the circumferential section of the annular surface of the filter element end cap. This arrangement provides a particularly homogenous flow towards the filter material.

To achieve the best possible fluid guidance at the lowest possible pressure loss, the fin that forms the molded component of the filter head may be provided with a rounded leading edge, as well as flat, diverging, lateral flow directing surfaces that extend from the leading edge. The flow directing surfaces adjoin the pipe socket of the filter head.

Another object of the invention is to provide an improved filter element in particular, for a filter device according to the invention.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figures 11, 12:
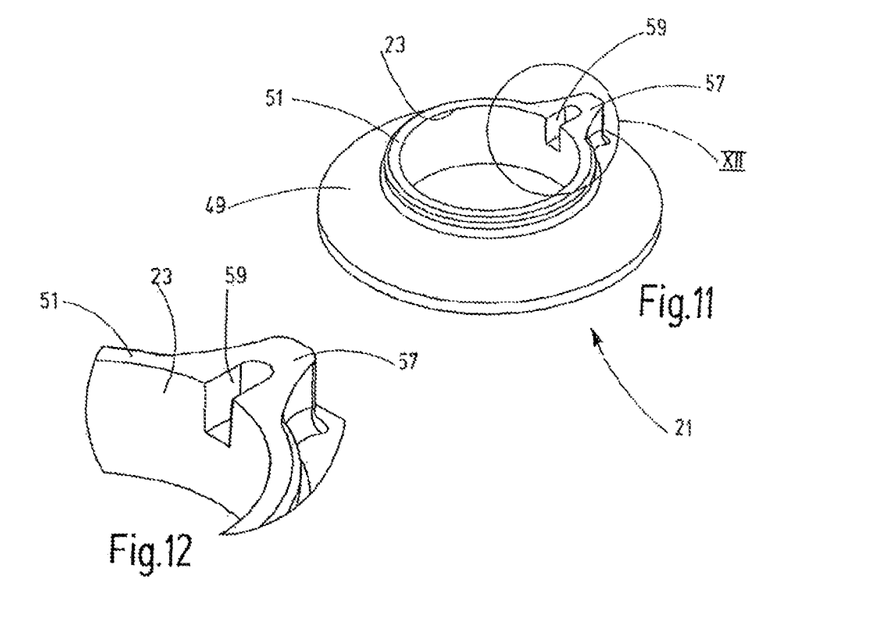
FIG. 11 is a perspective view of the upper end cap, which relates to the filter head, of a filter element that is to be inserted into the filter bowl of the first exemplary embodiment.
FIG. 12 is an enlarged, perspective view of the portion of the end cap designated in FIG. 11 with XII.
Figures 13, 14:
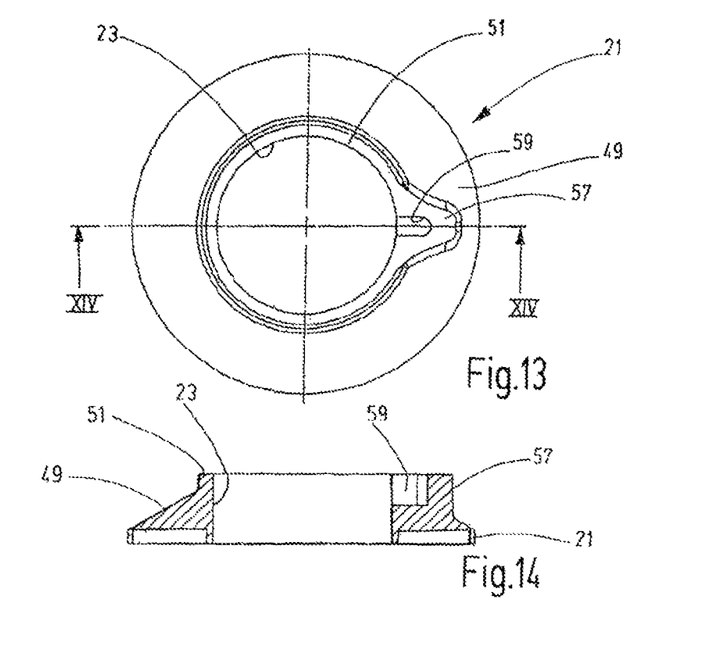
FIG. 13 is a plan view of the end cap of FIG. 11.
FIG. 14 is a side view in section of the end cap taken along line XIV-XIV of FIG. 13.
Figures 15, 16, 17, 18:
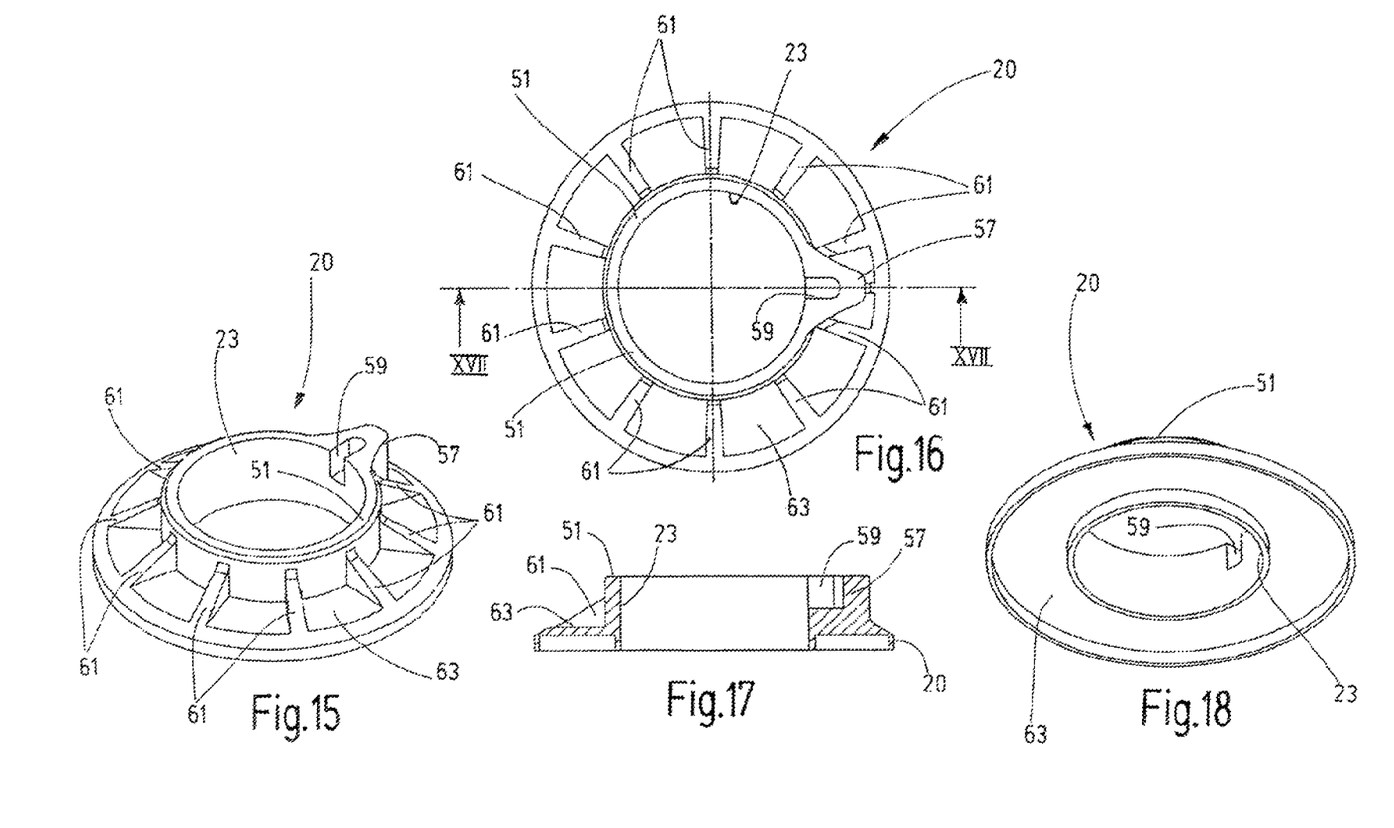
FIG. 15 is a perspective view of an upper end cap according to a second exemplary embodiment of the filter element of the invention.
FIG. 16 is a plan view of the end cap of FIG. 15.
FIG. 17 is a side view in section of the end cap along line XVII-XVII of FIG. 16.
FIG. 18 is a perspective view of the underside of the end cap of FIG. 15.

The first exemplary embodiment of the filter device depicted in the figures comprises a filter body 1 with a plain cylindrical filter bowl 3 that is closed at the bottom and with a filter head 5 that forms the upper end of the filter bowl 3. The filter head 5 is attached via thread 9 to filter bowl 3 to enable the insertion and removal of a replaceable filter element 7 from filter body 1, in which the sealing ring 10 provides the seal. The filter element 7 is constructed in a way that is common to filter devices of this kind and comprises a filter material 11 in form of a hollow cylinder, which surrounds an inner filter cavity 13 that forms the filtrate chamber. The filtrate chamber is separated by the filter material 11 from the unfiltrate chamber 14 that surrounds the outside of filter element 7. When in operation, unfiltrate is supplied via an inflow chamber 17 through an unfiltrate connection point 15 that is located on filter head 5 in housing 1. As is common practice in filter elements of this kind, the filter material 11 of the filter element 7 is encased by a lower end cap 19 and an upper end cap 21 in a first exemplary embodiment. The upper end cap is depicted separately in the FIGS. 11, 13 and 14. The upper end cap 21 comprises a central opening 23 in fluid connection or communication with a passage 25 when the filter element 7 is disposed in operating orientation in housing 1. The passage 25 extends similar to a pipe bent at right angles inside the filter head 5 through the inflow chamber 17 to the connection point 27 for the discharge of the filtrate flow, which passage exits from the internal filter cavity 13. The connection point 27 is located diametrically opposite to the connection point 15 for the supply of the unfiltrate flow. To provide for the fluid connection between passage 25 of the filter head 5 and the internal cavity 13 of filter element 7, the filter head 5 is provided with a pipe socket 29 that passes through the inflow chamber 17. The pipe socket 29 forms the element seat for the filter element 7 which, when filter element 7 is in operating orientation, engages with the opening 23 of end cap 21. An O-ring 31 is located on the outside of pipe socket 29 and provides the seal (see in particular FIG. 7).

Figure 1:
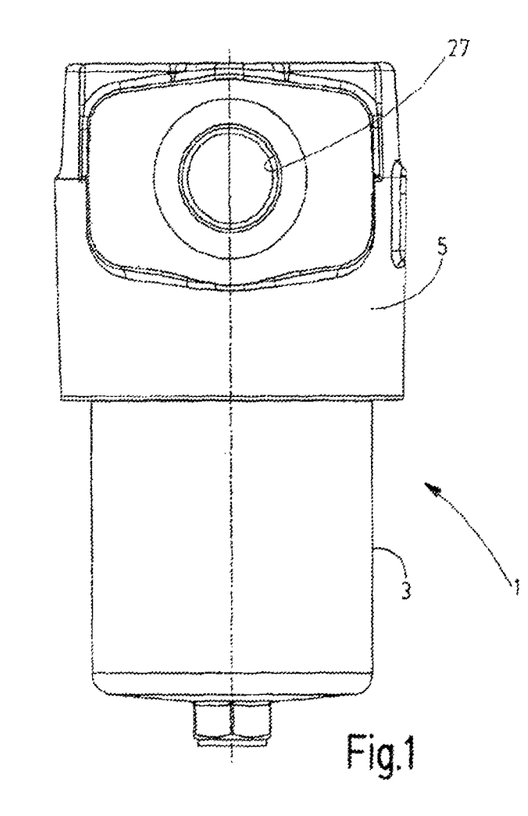
FIG. 1 is a side view of a filter device according to a first exemplary embodiment of the invention, with a view of the connection point for the supply of the unfiltrate flow.
Figure 2:
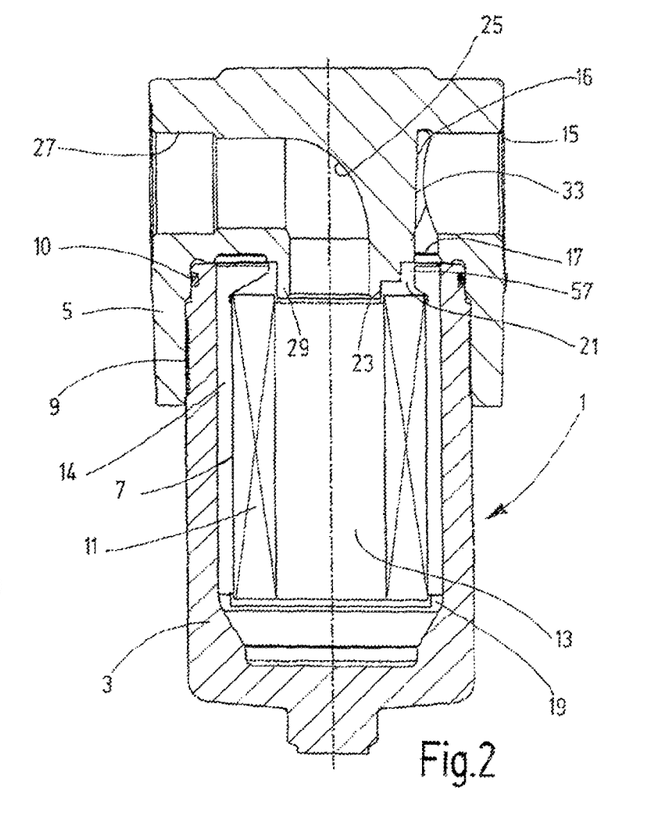
FIG. 2 is a side view in section of the first exemplary embodiment rotated by 90° compared to that of FIG. 1.
Figure 3:
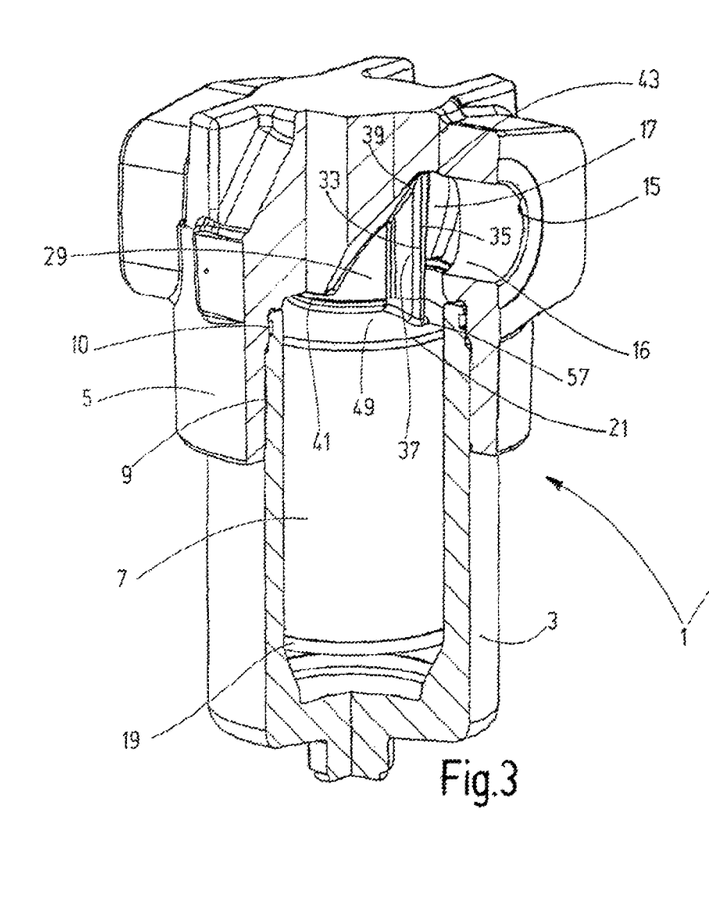
FIG. 3 is a perspective view in section of the first exemplary embodiment, depicting a half-section view with vertically extending sectional planes.
Figure 4:
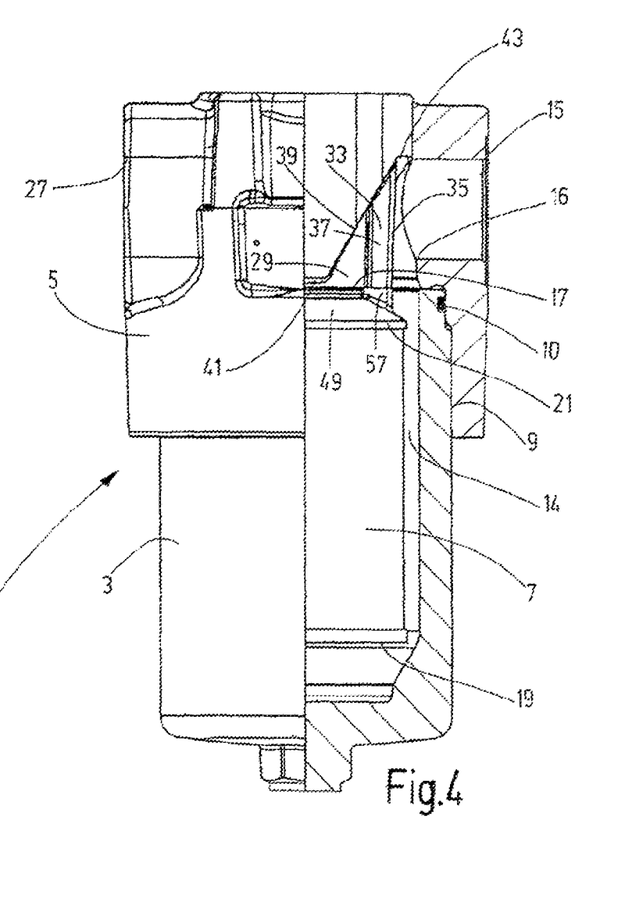
FIG. 4 is a side view of the first exemplary embodiment, half in side elevation and half in longitudinal section.
Figures 5, 6, 7:
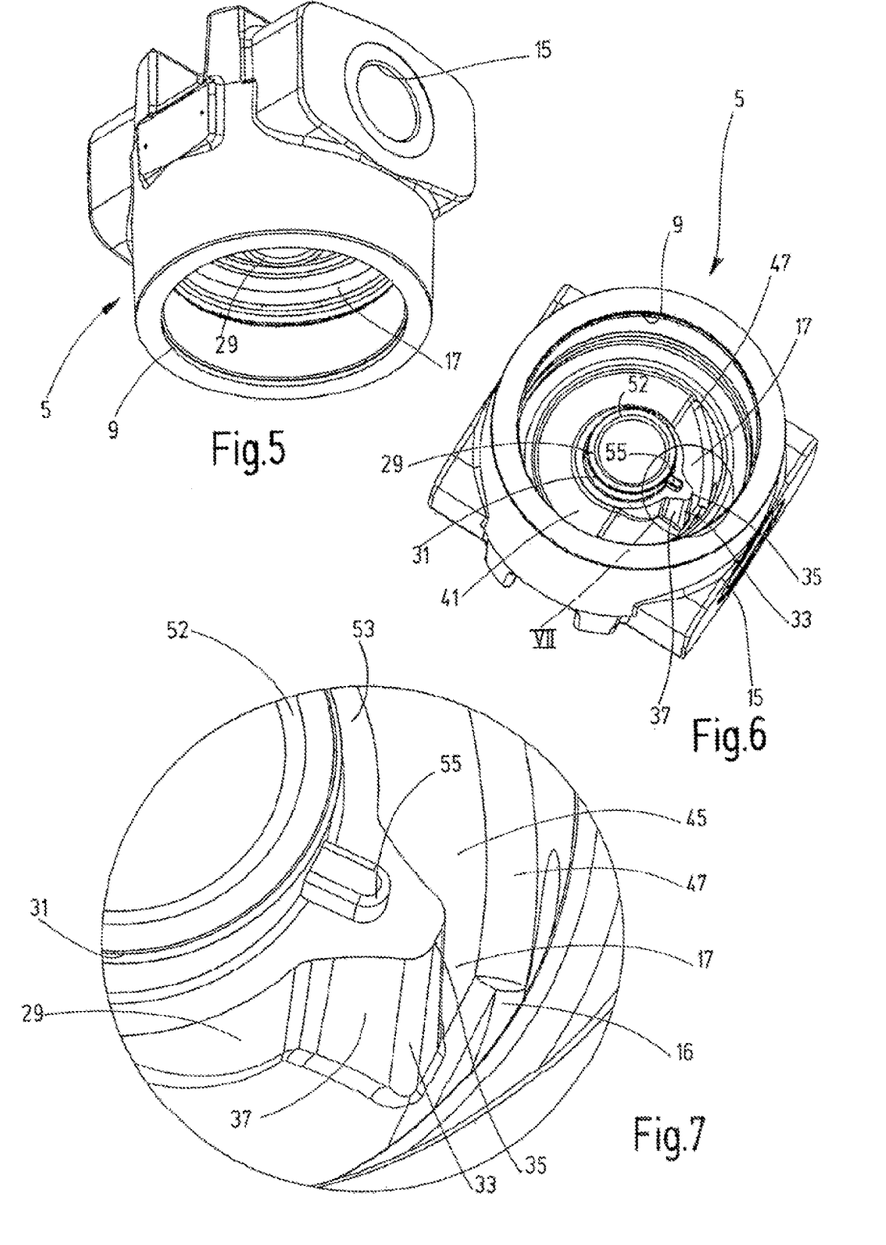
FIG. 5 is a perspective view of the underside of the filter head only of the first exemplary embodiment.
FIG. 6 is a perspective view of the filter head of FIG. 5 depicting the fluid inflow chamber formed on the underside.
FIG. 7 is an enlarged, perspective view of the portion of the filter head designated with VII in FIG. 6.
Figure 8:
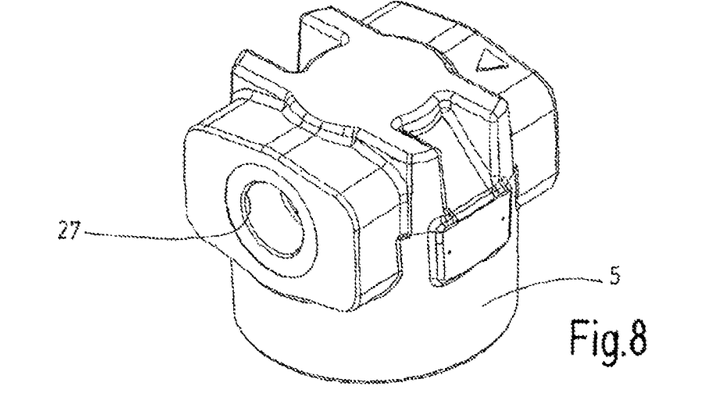
FIG. 8 is a perspective view of the filter head of FIG. 5, depicting the top end and the connection point for the filtrate flow.
Figure 9:
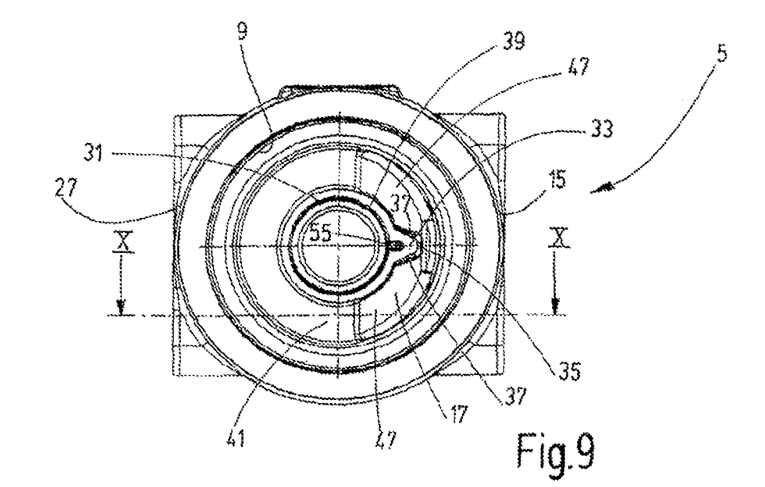
FIG. 9 is a plan view of the underside of the filter head of FIG. 5.
Figure 10:
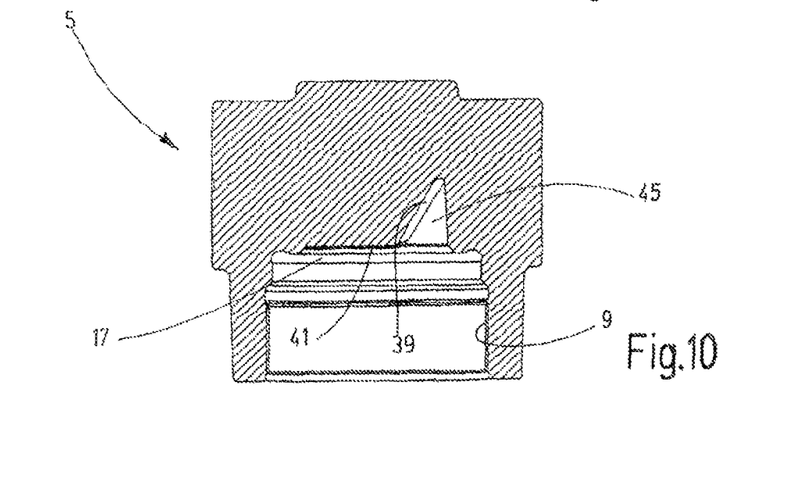
FIG. 10 is a side view in section of the filter head taken along line X-X in FIG. 9.

As can be most clearly seen in FIGS. 3, 6 and 7, the main part of the flow directing device is a fin 33. Fin 33 extends along the outside of the pipe socket 29 in axial direction in form of a radial protrusion, is aligned with the inlet port 16 at the connection point 15 for the inflow of the unfiltrate stream and spans the entire opening cross-section of port 16 of the connection point 15. The fin 33 extends in inflow chamber 17 vertically in the direction of the upper end cap 21 of the in operation vertically oriented filter element 7. In the first exemplary embodiment shown, the fin 33 is an integral, molded component of filter head 5. A corresponding molded component can also be provided as a separate part to be inserted. As is shown most clearly in FIGS. 6, 7 and 9, the fin 33 is provided, adjacent to a rounded leading edge 35 thereof, with lateral flow directing surfaces 37. The flow diverting surfaces 37 extend, diverging from each other, towards pipe socket 29. With this contour, the fin 33 forms a flow divider for the inflowing unfiltrate and spreads the flow laterally in inflow chamber 17. As depicted in FIGS. 3 and 4, and as is most clearly apparent from a comparison of FIGS. 9 and 10. The inflow chamber 17 has the greatest height in the inlet section that is adjacent to the inlet port 16. From inlet port 16, that height drops via an inclined surface 39 to a reduced height, where the height of the inflow chamber 17 is limited by a flat cover 41. This structure forms a pocket-shaped inflow opening 45 between the section 43 that is adjacent to the inlet port 16 and the cover 41. Located in this space and with clearance to the fin 33 are additional flow directing surfaces 47 disposed that have the form of parts of a bell-shaped mantle that widens out towards the bottom (see in particular FIG. 6).

With the filter element 7 in operational orientation, it forms with the upper side of the upper end cap 21 the bottom of the inflow chamber 17. As is most clearly shown in FIGS. 11, 13 and 14, the upper side of the end cap 21 has the shape of a conical surface 49 that drops off or tapers to the outside and surrounds the axially protruding rim 51, which in turn surrounds the central opening 23. The conical surface 49 which, with the filter element 7 in operating orientation, forms a bottom surface of the inflow chamber 17, acts at the same time as a further flow directing surface, which allows the unfiltrate stream to flow away homogenized into the unfiltrate chamber 14 via its circumferential rim.

As is most apparent from FIG. 7, the pipe socket 29 is provided with a flat end face 53, which is, compared to end rim 52 that is surrounded by the sealing ring 31, slightly offset towards the back. This end face 53 extends also radially as the end section of fin 33. A radially protruding tongue 55 is located in this end section. With the filter element in operating orientation, the end cap 21 with its flat rim 51 rests flush against the end face 53 of the pipe socket 29. On the end cap 21 at the rim 51 of opening 23, a radially projecting nose 57 is formed. When in operating orientation, nose 57 is aligned with the fin 33 on pipe socket 29 and is provided with a recess 59 to engage with the tongue 55. In this way the tongue 55 and the recess 59 form locating elements of a locking arrangement that predetermines the rotational position of the filter element 7. At the same time the nose 57 is externally shaped such that it forms a smooth continuation of the flow directing surfaces 37 of fin 33. Thus, the formed flow divider extends within the inflow opening 45 from the upper end of the inflow chamber 17 up to the flow directing surface formed by the conical surface 49 of end cap 21.

The FIGS. 15 to 18 depict a modified or second exemplary embodiment of the upper end cap 20. The only difference to the end cap 21 is that, instead of providing a full annular mantle, on the upper side forming a conical surface 49 that surrounds the central opening 23, a collar of radial fins 61 is formed that protrude from a flat bottom 63 of the end cap 20. Besides the material savings achieved compared to a solid body, the collar of fins can contribute as a kind of guide vane for the homogenization of the flow, for example, at low unfiltrate velocities. The above described receiving socket does not have to be plain cylindrical; rather, it may have any desired shape, for example, a shape of polynomial, an orbiform curve or an oval etc.

While various embodiments have been chosen to illustrate the invention, it will be understood by those skilled in the art that various changes and modifications can be made therein without departing from the scope of the invention as defined in the claims.

The invention claimed is:

1. A filter device, comprising:
    a filter body having a filter bowl and a filter head, said filter head being removably coupled to said filter bowl and having an inflow chamber;
    an unfiltrate connection point in said filter head for supplying an unfiltrate flow;
    a filtrate connection point in said filter head for discharging a filtrate flow;
    a filter element containing filter material in said filter body and being in fluid communication with said connection points for filtration of the unfiltrate flow, said filter element being oriented vertically and including an end cap enclosing a cylindrical and radial outer surface of said filter material and forming a bottom of said inflow chamber with an outer annular surface of said end cap, a path of the unfiltrate flow extending via a circumferential edge of said outer annular surface into an unfiltrate chamber surrounding said outer surface of said filter material; and
    a flow directing device being a molded component, being a component of said filter head and being on said filter head, and directing the unfiltrate flow applied thereto to surface sections of said filter material during filtering operation.

2. A filter device according to claim 1 wherein said molded component is an integral part of said filter head.

3. A filter device according to claim 1 wherein said molded component is in said filter head adjacent said unfiltrate connection point and forms a flow divider with two flow directing surfaces diverting the unfiltrate flow entering said unfiltrate connection point into two flow diverging directions within said inflow chamber, said inflow chamber opening toward said filter bowl.

4. A filter device according to claim 1 wherein said annular surface of said end cap forms a further flow directing conical surface, said conical surface dropping away from a circumferential rim thereof.

5. A filter device according to claim 3 wherein said unfiltrate connection point comprises an inlet port extending radially in said filter head relative to a longitudinal axis of said filter body; and
    said molded component is in a shape of a fin facing said inlet port, spanning a cross-section of said inlet port and extending in said inflow chamber vertically relative to an upper end cap on said filter element, said fin extending vertically in an operational position thereof.

6. A filter device according to claim 5 wherein
said upper end cap comprises an integral projection protruding from an annular surface of said end cap forming a bottom of said inflow chamber to form an additional component of said flow directing device in the operational position, said projection being aligned with said molded component and forming a continuous extension of said flow directing surfaces of said molded component.

7. A filter device according to claim 1 wherein
said filter head comprises an element seat therein coupling said filter element thereto, said element seat being a pipe socket receptacle engaging a central opening in an upper end cap of said filter element, said pipe socket receptacle being in fluid communication with an internal filter cavity of said filter element for discharging the filtrate flow; and
said molded component is a vane shaped member molded to an outer lateral side of said pipe socket.

8. A filter device according to claim 1 wherein
said molded component has a first interacting positioning element on an end thereof that abuts a shoulder on an end cap of said filter element, said shoulder having a second interacting positioning element predetermining a rotated operating position of said filter element when engaged with said first interacting positioning element.

9. A filter device according to claim 5 wherein
said inflow chamber has a greater height in a part thereof adjacent to said inlet port than in a remaining part of said inflow chamber separated from said inlet port; and
said filter head comprises inclined surfaces spaced from said molded component and being parts of a bell-shaped mantle that widens out in a direction toward said upper end cap so as to form additional flow directing surfaces guiding the unfiltrate flow towards a circumferential section of an annular surface of said upper end cap.

10. A filter device according claim 5 wherein
said fin comprises a rounded leading edge; and
said flow directing surfaces are flat, diverge from one another and extend from said leading edge, said flow directing surfaces adjoin a pipe socket of said filter head.

11. A filter element comprising:
a filter element containing filter material; and
an end cap on one end of said filter element, said end cap having a nose forming an unfiltrate flow directing device operable with a molded component of a filter head of a filter housing of a filter device in which said filter element is mountable, said filter element being oriented vertically and including an end cap enclosing a cylindrical and radial outer surface of said filter material and forming a bottom of an inflow chamber with an outer annular surface of said end cap, a path of the unfiltrate flow extending via a circumferential edge of said outer annular surface into an unfiltrate chamber surrounding said outer surface of said filter material.

12. A filter device, comprising:
a filter body having a filter bowl and a filter head, said filter head being removably coupled to said filter bowl;
an unfiltrate connection point in said filter head for supplying an unfiltrate flow;
a filtrate connection point in said filter head for discharging a filtrate flow, said unfiltrate connection point including an inlet port extending radially in said filter head relative to a longitudinal axis of said filter body;
a filter element containing filter material in said filter body and being in fluid communication with said connection points for filtration of the unfiltrate flow; and
a flow directing device being a molded component, being a component of said filter head and being on said filter head, and directing the unfiltrate flow applied thereto to surface sections of said filter material during filtering operation, said molded component being in said filter head adjacent said unfiltrate connection point and forming a flow divider with two flow directing surfaces diverting the unfiltrate flow entering said unfiltrate connection point into two flow diverging directions within an inflow chamber, said inflow chamber opening toward said filter bowl, said molded component being in a shape of a fin facing said inlet port, spanning a cross-section of said inlet port and extending in said inflow chamber vertically relative to an upper end cap on said filter element, said fin extending vertically in an operational position thereof, said fin being spaced from sidewalls of both said inflow chamber and said inlet port and having two relatively angularly oriented flow directing surfaces.

13. A filter device according to claim 12 wherein
said filter element is oriented vertically and comprises an end cap enclosing a cylindrical and radial outer surface of said filter material and forming a bottom of said inflow chamber with an outer annular surface of said end cap, a path of the unfiltrate flow extending via a circumferential edge of said outer annular surface into an unfiltrate chamber surrounding said outer surface of said filter material.

14. A filter device according to claim 13 wherein
said annular surface of said end cap forms a further flow directing conical surface, said conical surface dropping away from a circumferential rim thereof.

15. A filter device according to claim 12 wherein
said upper end cap comprises an integral projection protruding from an annular surface of said end cap forming a bottom of said inflow chamber to form an additional component of said flow directing device in the operational position, said projection being aligned with said molded component and forming a continuous extension of said flow directing surfaces of said molded component.

16. A filter device according to claim 12 wherein
said filter head comprises an element seat therein coupling said filter element thereto, said element seat being a pipe socket receptacle engaging a central opening in an upper end cap of said filter element, said pipe socket receptacle being in fluid communication with an internal filter cavity of said filter element for discharging the filtrate flow; and
said molded component is a vane shaped member molded to an outer lateral side of said pipe socket.

17. A filter device according to claim 12 wherein
said molded component has a first interacting positioning element on an end thereof that abuts a shoulder on an end cap of said filter element, said shoulder having a second interacting positioning element predetermining a rotated operating position of said filter element when engaged with said first interacting positioning element.

18. A filter device according to claim 12 wherein
said inflow chamber has a greater height in a part thereof adjacent to said inlet port than in a remaining part of said inflow chamber separated from said inlet port; and
said filter head comprises inclined surfaces spaced from said molded component and being parts of a bell-shaped mantle that widens out in a direction toward said upper end cap so as to form additional flow directing surfaces guiding the unfiltrate flow towards a circumferential section of an annular surface of said upper end cap.

19. A filter device according claim 12 wherein said fin comprises a rounded leading edge; and said flow directing surfaces are flat, diverge from one another and extend from said leading edge, said flow directing surfaces adjoin a pipe socket of said filter head.

\* \* \* \* \*